April 30, 1935.   A. KONOFF   1,999,730
DOLL'S EYES AND METHOD FOR MANUFACTURING THE SAME
Filed Oct. 21, 1930   2 Sheets-Sheet 1
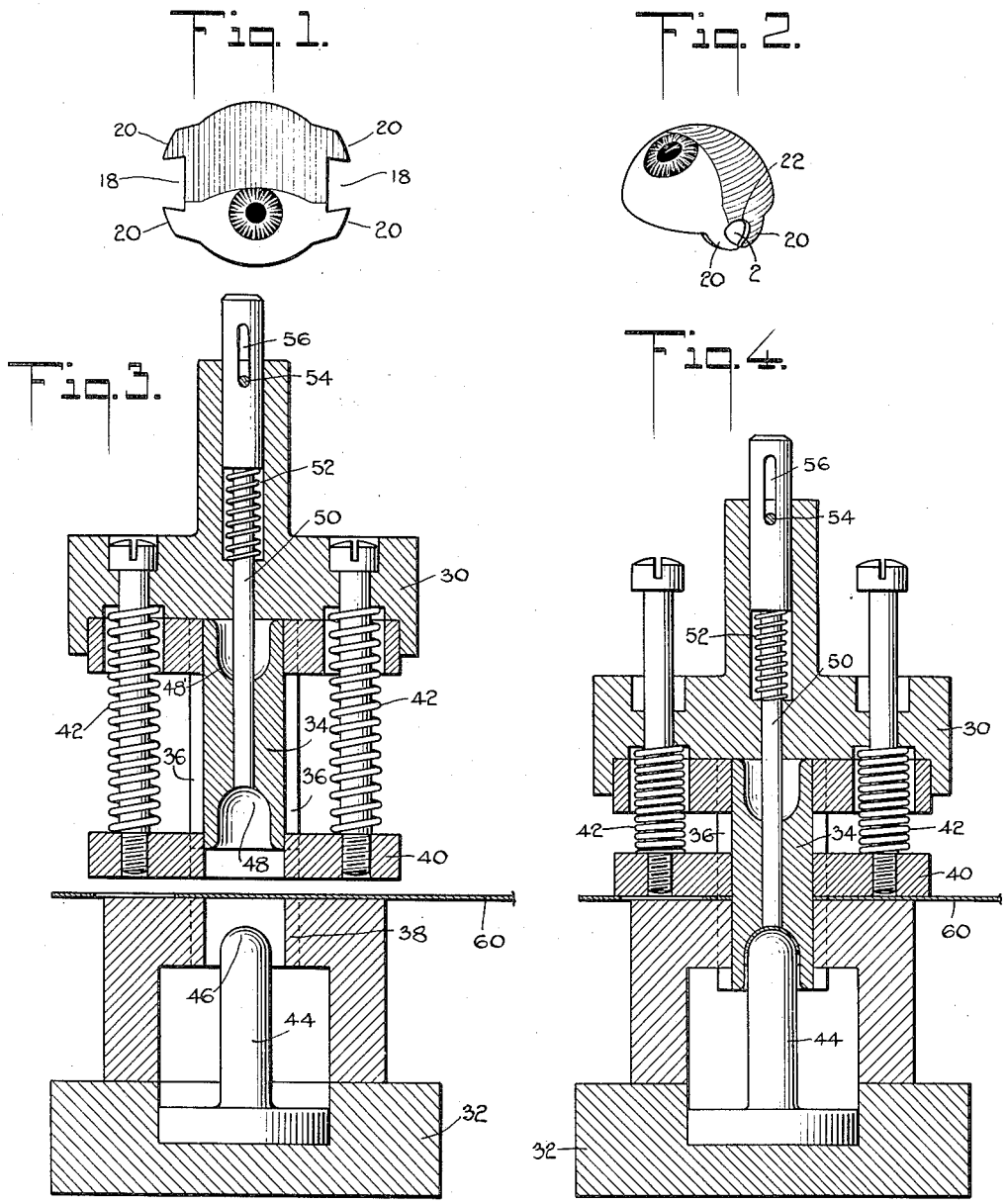
INVENTOR
Alexander Konoff
BY
ATTORNEYS April 30, 1935.   A. KONOFF   1,999,730
DOLL'S EYES AND METHOD FOR MANUFACTURING THE SAME
Filed Oct. 21, 1930   2 Sheets-Sheet 2
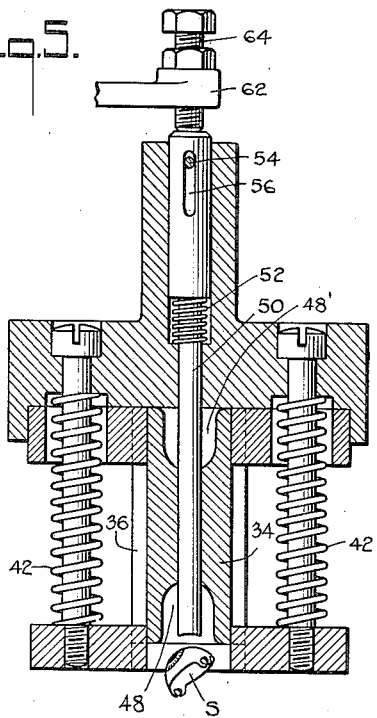
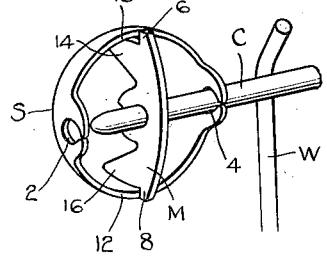
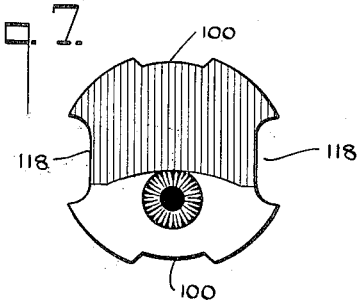
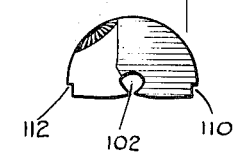
INVENTOR
Alexander Konoff
BY
ATTORNEYS Patented Apr. 30, 1935

1,999,730

UNITED STATES PATENT OFFICE 1,999,730

DOLL'S EYES AND METHOD FOR MANUFACTURING THE SAME

Alexander Konoff, New York, N. Y., assignor, by mesne assignments, to Margon Corporation, New York, N. Y., a corporation of New York Application October 21, 1930, Serial No. 490,230

12 Claims. (Cl. 113—116)

This invention relates to dolls' eyes, and to a method for manufacturing the same.

In Letters Patent 1,865,475 issued to Samuel Marcus July 5, 1932, there are disclosed movable eye sets for dolls, which consist simply of a cross rod carrying a pendant gravity operated weight, a pair of plain, approximately hemispherical eye shells or eye members which are mounted freely on the cross rod both as regards rotation and reciprocation, and a pair of simple, intermediate members which frictionally engage the cross rod, and which serve to cause rotation of the eye members with the cross rod, and to limit the free reciprocation of the eye members on the cross rod. With this construction the eye members are automatically adjustable on the cross rod to fit the spacing of the eye sockets in which the eye set is later used, and at the same time manual adjustment of the eye members on the cross rod is possible by reason of the frictional engagement of the intermediate members with the cross rod. The present invention relates to eye members, especially eye members suitable for such eye sets, and to a novel method for facilitating, simplifying, and cheapening the cost of, the manufacture of the same.

The eye member consists of an approximately hemispherical shell which may be formed by stamping a blank of sheet material and thereafter drawing or pressing the same into the desired hemispherical shape. The sheet material from which the blank is stamped is preferably previously printed in simulation of the iris and upper lid of the eye. In accordance with the prior practice, holes were subsequently punched at each side of the eye member for mounting the same on the cross rod, these holes being preferably located at the center of curvature of the surface of the eye member. This not only necessitated an extra operation, but was particularly troublesome because of the nature of that operation inasmuch as it was necessary to manually position each of the eye members accurately in place on the die or jig used for punching the holes. These holes had to be correctly located with respect to the pupil or iris of the eye, and a suitable indexing finger or cross hairs were necessary, with respect to which each of the eye members had to be individually located before the punching operation could proceed.

One primary object of the present invention is to overcome all of the foregoing difficulties, and, in fact, to entirely dispense with the operation of punching the holes in the sides of the eye member. To this end the eye shell blanks are stamped to a special configuration including recesses at the sides thereof which are so disposed that when the blank is bent or drawn into substantially hemispherical shape the sides of the recesses form apertures for mounting the eye shell on the cross rod. A step product obtained during the practice of this method is a blank having such a pair of side recesses which, when the blank is subsequently shaped, will form the desired mounting means.

Another primary object of the present invention is to manufacture the eye shells in a single operation, or, in other words, not only to dispense with a separate operation for punching the holes in the eye shells, but also to combine the cutting and shaping operations so that a single machine operation will transform previously printed sheet material into finished eye members. To accomplish this, the printed sheet metal is fed to a die arranged to punch blanks of desired configuration and to immediately thereafter form the blank between appropriately shaped forming members which bend the blank into the desired approximately hemispherical shape, and which simultaneously cause the side recesses of the blank to close into apertures for mounting the eye shell on the cross rod. The die for this purpose comprises not only the customary female die including a punch plate and the relatively movable male die including a punch, which punch is of appropriate cross section to cut the desired step product blanks, but the female die further includes a forming post with a hemispherical end, while the male die further includes a concave forming member at the end of the punch, so that the blank is cut and shaped, and provided with side apertures all during a single reciprocation of the die.

In the above identified Marcus Patent 1,865,495, the eye members are described as having slots at the top and bottom edges which incidentally function to limit the permissible sliding movement of the eye members on the cross rod, but which more importantly serve to provide bearing surfaces accurately located with respect to the corresponding bearing surfaces on the intermediate members which cause the eye shells to rotate with the cross rod. Such slots were preferably cut at the same time that the apertures were punched in the sides of the eye member, and were located in uniform relation to the hemispherical surface of the eye member, regardless of the precise location of the peripheral edge of the eye member, for the latter is irregular and variable due to stretching and distortion of the metal during the drawing operation which forms the same to shape. In accordance with the present invention the subsequent punching operation is dispensed with, and, of course, it is therefore further desirable to dispense with the formation of specially located slots. Accordingly, still another primary object of this invention is to so form the eye members that the rear or peripheral edges thereof will be accurately located with respect to the center of curvature thereof, in order to make the same suitable for direct cooperation with an intermediate member. The desired accuracy may best and most simply be obtained by making the eye member relatively shallow, that is, by forming the same with a surface which is considerably less, rather than considerably more, than a hemisphere, so that the shaping operation is essentially only a bending operation rather than a drawing operation. When this is done, no appreciable distortion or stretch of the metal takes place, and consequently a smooth, even, and accurately located peripheral edge is obtained on the eye member. An additional advantage arises because of the fact that the printing and protective lacquer on the sheet material is not subject to the abrasion and distortion which takes place when the eye member is drawn more deeply. The apertures for mounting the eye member on the cross rod should, of course, be located at the center of curvature of the eye member, and this is most simply accomplished by providing the step product blank with a pair of lugs projecting from each of the sides thereof, the spaces between which form the necessary side recesses. When the blank is pressed to shape, the upper and lower lugs in each pair are bent toward one another and form the mounting means for receiving the cross rod.

To the accomplishment of the foregoing and such other objects as will hereinafter appear, my invention consists in the eye shell and method and means for making the same, and their relation one to the other as hereinafter are more particularly described in the specification and sought to be defined in the claims. The specification is accompanied by drawings in which:

Fig. 1 is a blank which is a step product in the manufacture of the preferred form of eye shell;

Fig. 2 is a perspective view of the preferred eye shell;

Fig. 3 is a sectional elevation through a die preparatory to punching and shaping an eye shell;

Fig. 4 shows the die after the punching and shaping operation;

Fig. 5 shows the ejection of the finished eye member;

Fig. 6 is a perspective view of the preferred form of eye member mounted in place on the cross rod;

Fig. 7 is a blank which is a step product in the manufacture of a modified form of eye shell; and Fig. 8 is a side view of the modified eye shell.

Referring first to Fig. 6, the eye set consists of a cross rod C, at the center of which there is affixed a depending wire W for carrying a gravity operated weight, and at each end of which there is mounted an eye shell S and an intermediate member M. The eye shell has apertures 2 and 4 at the sides thereof for freely mounting the same on the cross rod C. The intermediate member M is mounted on the cross rod C with a strong frictional engagement which permits manual adjustment of the intermediate member and with it the eye shell relative to the cross rod, but which causes the intermediate member to retain its manually adjusted position. The upper and lower projections 6 and 8 on the intermediate member M bear against the upper and lower peripheral edges 10 and 12, respectively, of the eye shell, and cause the latter to rotate with the cross rod. Free longitudinal movement of the eye shell on the cross rod is permitted, but such movement is limited by reason of the upper and lower arms 14 and 16 on the intermediate member, the spacing between which is slightly less than the diameter of the shell, so that only limited reciprocation of the eye shell on the cross rod is permitted.

It is desirable to prevent appreciable projection of the ends of the cross rod beyond the outer walls of the eye shell, and this may be accomplished by terminating the cross rod within the eye shell in the manner here illustrated. With such an arrangement only the inner one of the apertures 2 and 4 is usefully employed, but it is desirable to provide both apertures, in order that a single die may be employed for making both right and left eyes. The eye shell is, in effect supported on the cross rod by a three point support, which is sufficient to properly align the same when it is resiliently pressed into contact with the eye socket walls by the mounting means which support the eye set in the doll's head.

It will be noted that the apertures 2 and 4 are not cut through a solid wall, but rather are open at the rear sides thereof. The manner in which these apertures are formed is almost self-evident from an inspection of Figs. 1 and 2. In Fig. 1, which is a plan view of a blank which is stamped from preferably previously printed sheet material, it will be noted that the blank is provided with recesses 18 at the sides thereof, or, viewed in a different aspect, the blank is provided with pairs of lugs 20 at the sides thereof. The walls of the recesses 18 are so shaped and located that when the blank is formed into the desired approximately hemispherical shape, as is shown in Fig. 2, the lugs 20, or the side walls of the recesses 18, are bent toward one another to form the aperture 2. This aperture need not be truly circular, and the design of the step product blank illustrated in Fig. 1 is greatly simplified by making only the forward edge 22 of the aperture 2 of proper shape to bear accurately against the cross rod, the remaining walls being determined only with a view to clearing the cross rod. Such a design is proper and accurate, because in actual use the cross rod is urged toward the front wall of the doll's head in order to hold the eye shell in engagement with the eye socket, and it follows, therefore, that the cross rod bears against only the front wall 22 of the aperture in the eye shell.

The complete eye shell may be formed from a previously printed strip of material in substantially a single machine operation, by employing a die of the type illustrated in Figs. 3, 4, and 5. The die comprises relatively movable male and female die portions. The male die portion includes a punch 34 the cross sectional configuration of which corresponds to the desired shape of the step product blank, a preferable form of which is shown in Fig. 1. This punch, of course, includes wings 36 for cutting the lugs 20 on the blank. The female portion of the die includes a punch plate 38 which mates with the punch 34. The male die portion 30 is preferably fitted with a suitable stripper plate, such as the plate 40, which is reciprocably mounted on the punch 34 and resiliently urged to its downward position by springs 42.

In order to permit the complete formation of the eye member in a single stroke or reciprocation of the die, the die is arranged for the forming or shaping, as well as the cutting or punching operation. This is accomplished by providing one of the die portions, preferably the lower stationary female die portion 32, with a forming post 44, the upper end 46 of which is hemispherical in shape. The lower end of the punch 34 is made into a corresponding forming member by hollowing the same to provide a concavity 48 which mates with the end 46 of the forming post 44 except for sufficient clearance therebetween to receive the sheet material from which the eye shells are made. The upper die member 30 is preferably provided with a knockout or ejector rod 50, the lower end of which is flush with the surface of the concavity 48. A spring 52 holds the ejector rod 50 in its upper position which is determined by the relation between a pin 54, fixed in the upper die member 30, and a slot 56 in the ejector rod.

The operation of the disclosed apparatus may readily be understood by a comparison of Figs. 3, 4, and 5, which show successive steps in the operation of the die through a single cycle. The material worked upon is indicated at 60 and preferably consists of a previously printed and protectively lacquered strip of sheet metal. This strip is fed through the die in steps of proper dimension to properly center the printed images of the eye in relation to the punch of the die, by means which may be of conventional type known in the art, but which is desirably of a rather accurate type in order to insure accurate location of the pupil of the eye, so that the eye will focus properly when subsequently mounted in the doll's head.

When the upper die portion descends, the punch 34 cuts a blank, such as that shown in Fig. 1, from the strip 60, and forces this blank against the forming post 44, as is clearly evident in Fig. 4. The stripper plate 40 is meanwhile held against the strip 60 by compression of the springs 42. Upon upward reciprocation of the die 30, the shaped blank is drawn upward with the punch 34. The stripper plate 40 leaves the sheet metal 60 after the punch has traveled above the same, thereby insuring clean stripping of the material worked upon, from the punch. As the upper die portion nears the end of its upward stroke, the upper end of the ejector rod 50 reaches a fixed stop 62, the precise position of which may be adjusted by a screw and lock arrangement 64, and this arrests the upward movement of the knockout rod 50, which is equivalent to a downward reciprocation thereof, and thus serves to eject the finished eye shell S from the punch. The entire punch may be mounted at a backward slope in order to cause the finished eye shells to fall clear of the strip 60 being worked upon, as is well understood in the art.

It will be noted that the upper end of the punch 34 is hollowed out to form a recess 48' similar to the recess 48. This is done merely to double the useful life of the punch by permitting reversal, or use of either end of the same.

The basic idea underlying the present invention and making possible the manufacture of the complete eye shell in a single machine operation, resides in the provision of a step product blank of such configuration that when formed into hemispherical shape the desired mounting apertures will automatically be formed. Thus, a modified form of blank is shown in Fig. 7, in which recesses 118, corresponding to the recesses 18 in Fig. 1, are provided. Recesses 100 may also be provided at the top and bottom of the blank. When this blank is formed into shape, an eye shell is obtained, a side elevation of which is shown in Fig. 8. The recesses 118 close up to form the apertures 102, while the recesses 100 become top and bottom slots 110 and 112. It will be noted that this eye shell is relatively deep, and is substantially greater, rather than substantially less than a hemisphere in area, and is provided not only with the side apertures 102, but also with the top and bottom slots 110 and 112 which mate with the upper and lower ends of the intermediate member M, and provide bearing surfaces for the same, as well as limit the permissible longitudinal movement of the eye member on the cross rod.

The eye member described in connection with Figs. 1, 2, and 6 is considered preferable to that described in connection with Figs. 7 and 8, because the first described eye member is relatively shallow, being substantially less than a hemisphere in area, and the shaping of the same is therefore practically only a bending operation, rather than a drawing operation such as takes place when forming the relatively deep eye member of Figs. 7 and 8. The shallow eye member is therefore subjected to less strain, in consequence of which the paint and lacquer are not noticeably abraded and distorted, and no disturbance of the accurate location of the pupil of the eye results. This is true, regardless of the effect of heating the printed strip before passing the same through the die, for in either case the strip is preferably warmed, as is understood in this art, in order to prevent cracking of the lacquer. The difficulty here considered relates to an actual stretching or distortion of the shape of the printed image of the eye, rather than to superficial cracking of the lacquer. Furthermore, the location of the top and bottom edges 10 and 12 of the rear periphery of the eye member may be accurately predetermined, insuring close cooperation with the intermediate member M. The modified eye member of Figs. 7 and 8 is subjected to sufficient drawing of the metal to cause a certain amount of irregularity or indefiniteness in the location of the rear edges thereof. This difficulty is somewhat overcome by the presence of the recesses 100, because the metal at these points is not drawn to the full depth. The shallow eye member possesses no disadvantages relative to the deep eye member, because the cross rod may be located at the true center of curvature, and sufficient area is provided to insure proper opening and closing of the eye in the eye socket. In other words, only excess surface area has been discarded.

The eye shell of the present invention, and the method for making the same, and the many advantages thereof will, it is thought, be apparent from the foregoing detailed description thereof. A separate and rather troublesome operation for punching mounting apertures in the eye member in proper location to the pupil of the eye is entirely dispensed with, and the resulting eye member may be formed in a single machine operation. The method and apparatus employed in manufacturing the eye member is in no way appreciably more complex than that anyway necessary in the manufacture of eye members as heretofore practiced, and although a careful design of the configuration of the intermediate or step product blank from which the eye member is formed, is necessary, this design is not particularly difficult, and is negligible in comparison with the enormous saving resulting from the practice of the present invention.

It will be apparent that while I have shown and described my invention in the preferred forms, many changes and modifications may be made in the method and structures disclosed, without departing from the spirit of the invention, defined in the following claims.

I claim:

1. In the manufacture of eye shells for dolls' eyes the method which includes cutting eye shell blanks each having a pair of side recesses, drawing the blank into substantially hemispherical shape, and simultaneously contracting the sides of the recesses to form substantially closed apertures for mounting the eye shell on a cross rod.

2. In the manufacture of eye shells for dolls' eyes, the method which includes stamping from a previously printed strip of sheet metal, eye shell blanks, each having a pair of side recesses, drawing the blank into substantially hemispherical shape, and simultaneously contracting the sides of the recesses to form substantially closed apertures for mounting the eye shell on a cross rod at the center of curvature of the eye shell.

3. In the manufacture of eye shells for dolls' eyes, the method which includes stamping from a previously printed strip of sheet metal, eye shell blanks having pairs of lugs projecting from the sides thereof, bending the blank into a less than hemispherical shape, and simultaneously drawing the lugs together to form substantially closed apertures for mounting the eye shell on a cross rod at the center of curvature of the eye shell.

4. A step product in the manufacture of dolls' eyes comprising a printed sheet metal blank having a pair of side recesses of such shape that when the blank is formed into a substantially hemispherical surface the sides of the recess will form bearing apertures for mounting the resulting eye shell on a cross rod at the center of curvature of the eye shell.

5. A step product in the manufacture of dolls' eyes comprising a printed sheet metal blank having a pair of spaced lugs projecting at each side of the blank and so disposed that when the blank is formed into a less than hemispherical surface the lugs will form bearing apertures for mounting the resulting eye shell on a cross rod at the center of curvature of the eye shell.

6. A doll's eye comprising a shell which is less than a hemisphere in area and which includes at each side thereof pairs of backwardly projecting lugs which form apertures therebetween for mounting the eye shell on a cross rod at the center of curvature of the eye shell, said eye being made from a single integral blank of sheet material.

7. A doll's eye comprising a printed sheet metal shell which is less than a hemisphere in area and which includes at each side thereof pairs of backwardly projecting lugs the ends of which meet to form apertures therebetween for mounting the eye shell on a cross rod at the center of curvature of the eye shell, said eye being made from a single integral blank of sheet metal.

8. A step product in the manufacture of dolls' eyes comprising a printed sheet blank having a pair of spaced lugs projecting from at least one side of the blank and so disposed that when the blank is formed into a less than hemispherical surface the lugs will form a bearing aperture for mounting the resulting eye shell on a cross rod at the center of curvature of the eye shell, said blank being printed in simulation of the pupil, iris, and white of the eye, with the pupil and iris located below the center of the blank.

9. A doll's eye comprising a shell formed into approximately hemispherical shape and provided with a side aperture for mounting the eye on a cross rod at the center of curvature of the eye shell, the peripheral edge of said eye shell at the upper and lower portions thereof being continuous and definitely related to the aperture in a pre-determined manner in order to provide bearing surfaces for cooperating with mounting means on the cross rod, said eye being made from a single blank of sheet material.

10. A step product in the manufacture of dolls' eyes comprising a flat sheet blank defined by outwardly curved opposed edges and inwardly recessed opposed edges connecting the outwardly curved edges, the blank being of such shape that it may be drawn into substantially hemispherical form, and the recesses being of such shape that when the blank is formed into a substantially hemispherical surface the sides of the recess will form bearing apertures for mounting the resulting eye shell on a cross rod at the center of curvature of the eye shell.

11. In the manufacture of eye shells for dolls' eyes, the method which includes cutting flat eye shell blanks each defined by outwardly curved opposed edges and connecting edges between the outwardly curved edges, one of said connecting edges being inwardly recessed, drawing the blank into substantially hemispherical shape, and simultaneously contracting the sides of the recess to form a substantially closed aperture for mounting the eye shell on a cross rod.

12. A step product in the manufacture of dolls' eyes comprising a flat sheet blank defined by outwardly curved opposed edges and connecting edges between the outwardly curved edges, one of said connecting edges being inwardly recessed, the blank being of such shape that it may be drawn into substantially hemispherical form and the recess being of such shape that when the blank is formed into a substantially hemispherical surface the sides of the recess will form a bearing aperture for mounting the resulting eye shell on a cross rod at the center of curvature of the eye shell.

ALEXANDER KONOFF.